United States Patent
Yellapragada et al.

(10) Patent No.: US 8,069,229 B2
(45) Date of Patent: Nov. 29, 2011

(54) TOPOLOGY STATIC ZONES

(75) Inventors: Subrahmanya Sarma V. Yellapragada, Hyderabad (IN); Narasimha C. Reddy, Hyderabad (IN); Sankar Natarajan, Hyderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 1116 days.

(21) Appl. No.: 11/646,408

(22) Filed: Dec. 28, 2006

(65) Prior Publication Data
US 2008/0162681 A1    Jul. 3, 2008

(51) Int. Cl.
*G06F 15/177* (2006.01)
*G06F 15/173* (2006.01)

(52) U.S. Cl. ........ 709/221; 709/220; 709/223; 709/224; 709/225; 709/226; 370/254

(58) Field of Classification Search .......... 709/220–226; 370/254
See application file for complete search history.

(56) References Cited

U.S. PATENT DOCUMENTS

| | | | |
|---|---|---|---|
| 7,099,912 B2 | 8/2006 | Ishizaki et al. | 709/201 |
| 7,103,653 B2 | 9/2006 | Iwatani | 709/223 |
| 7,194,538 B1 * | 3/2007 | Rabe et al. | 709/224 |
| 7,243,144 B2 * | 7/2007 | Miyake | 709/223 |
| 7,328,260 B1 * | 2/2008 | Muthiyan et al. | 709/224 |
| 7,656,884 B1 * | 2/2010 | DeSanti | 370/401 |
| 7,685,261 B1 * | 3/2010 | Marinelli et al. | 709/220 |
| 7,769,023 B2 * | 8/2010 | Parthasarathy et al. | 370/395.3 |
| 7,774,445 B1 * | 8/2010 | Weinbrecht et al. | 709/223 |
| 7,886,031 B1 * | 2/2011 | Taylor et al. | 709/221 |
| 7,934,018 B1 * | 4/2011 | Lavallee et al. | 709/248 |
| 2003/0085914 A1 * | 5/2003 | Takaoka et al. | 345/734 |
| 2004/0088417 A1 * | 5/2004 | Bober et al. | 709/227 |
| 2005/0021793 A1 * | 1/2005 | Kubsch et al. | 709/229 |
| 2007/0291785 A1 * | 12/2007 | Sharma et al. | 370/464 |

* cited by examiner

*Primary Examiner* — Ashok Patel
*Assistant Examiner* — Linglan Edwards
(74) *Attorney, Agent, or Firm* — Pillsbury Winthrop Shaw Pittman LLP

(57) ABSTRACT

Systems and techniques are provided for Topology-Static (TS) architecture within a computer system, and more particularly to the management of a Topology-Static architecture incorporating a storage area network (SAN). A SAN management system for monitoring and controlling zone integrity of a SAN. The SAN management system includes a monitoring module coupled to a SAN zone that includes at least one loop and optionally at least one fabric switch. When the status of the SAN zone changes, the monitoring manager sends an intimating signal to a zone manager. The zone manager determines whether such intimating signal is associated with a change pertaining to a node of any TS-Zone in "I" mode. If so, the zone manger sends a request to a switch manager for execution. After the execution, the zone manager further updates information stored in an internal storage relating to the change event.

23 Claims, 8 Drawing Sheets

TOPOLOGY STATIC ZONES

FIELD OF THE INVENTION

This invention relates generally to Topology-Static (TS) architecture within a computer system, and more particularly to the management of a Topology-Static architecture.

BACKGROUND OF THE INVENTION

A storage area network (SAN) has significantly changed the manner of storing and accessing data from a conventional local database, such as file servers, to a remote network of its own. With the increasing amount of data to be stored, the local database associated with a computer is no longer capable of storing all the data. The SAN has solved the problem by providing a network of storage that allows the multiple servers to share and access from separate networks of their own. The SAN is a dedicated and centrally managed information infrastructure that primarily provides communications and data transfers between computer nodes or interconnected devices, such as disks and tapes, storage nodes, servers or other devices. The SAN facilitates multiple users to access and share a pool of storage servers. Management of these types of systems plays an important role to secure the data access (i.e., who is authorized to access the data or who can access which devices and at what point in time.)

Fiber channel is a primary technology used in more recent SAN systems. Due to their high-speed, fiber channels enable the SAN to interconnect between servers and storage devices at data transfer rates of up to 200 Mbps in a dual loop configuration or 100 Mbps in a redundant mode. Typically, a fiber channel can be configured in various ways, such as a point-to-point configuration, a fiber channel arbitrated loops (FC-AL) configuration, and a switched fiber channel fabrics (FC-SW) configuration. The point-to-point fiber channel is a simple way to connect two devices directly together. The FC-AL includes a set of hosts and devices that are connected into a single loop. The FC-AL can support up to 126 devices and hosts on a single loop. In FC-SW, devices are connected in many-to-many topology using fiber channel switches. In this configuration, the number of devices that can be connected is unlimited.

A switched fiber channel fabrics FC-SW configuration employs at least one switched fiber channel fabric. A switched fiber channel fabric (or hereinafter "fabric") is a collection of fiber channel switches that connect the individual devices in the many-to-many topology. A storage fabric is a collection of the many fiber channel switches that connect the individual devices (e.g., hosts, nodes) in a SAN. With all of the data stored in a single, ubiquitous cloud of storage, controlling which hosts have access to what data is extremely important. Zoning, in this respect, provides an isolation boundary for such management.

Zoning may be employed to group devices according to operating system, application, function, physical address, or other criteria as needed. Zoning separates the SAN into logical sub-networks. A port (e.g., host adapters or storage controller ports) can be configured as part of a zone. A port may separate a zone, or a SAN into physical sub-networks. The storage fabric may be configured so that only ports in a given zone can communicate with other ports in the same zone. Typically, zoning is implemented at the port level with zone access controlled by the ports configured to allow access or prevent access in the fabric, or zoning is implemented using simple name server (SNS) software that operates on the fabric switch. With zoning implemented using a SNS software, a node is identified using the node's world wide name (NWWN) and a port is identified using the port's world wide name (PWWN). Using SNS a defined zoning table may be developed listing devices by availability within a specific zone, and accessibility by a specific list of hosts. In either zone implementation when a host entity attempts to connect to a SAN and requests a list of available storage devices, the host will only receive access data for those storage devices that the host was configured to receive through a specific port configuration, or a defined zoning table.

Although the zoning in the SAN segregates storage access, zoning implicitly binds the technology of SAN (e.g., servers and storage arrays that can access each other through managed port-to-port connections). Devices within a specific zone can recognize and communicate with each other, but may not be able to with devices in other zones, unless a device in that zone is configured for multiple zones. Hence any change in the SAN topology may affect the localized zone or zones, and any change within a zone may affect SAN topology.

Due to the characteristics of the zoning in the SAN, there exist a number of problems in conventional SAN management. Certain devices may be required for specific zone deployments and configurations. In deployments supporting very important data storage, redundant devices (e.g., secure servers or hubs) provide added reliability and security, and assist with maintaining a zone's integrity. In addition to security and protective features, specific deployments may have certain devices configured for specific internal routines (e.g., redundant disk arrays for rapid data recovery). For example, when a node in the SAN becomes non-functional, replacing the non-functional node may disturb the overall zone integrity, especially if a replacement node is not available. With any change in a particular entity, for example changing from a functional node to a non-functional node, another entity will directly or indirectly perceive the change. Oftentimes, a change in a particular entity is promptly corrected, especially when the resources exist within the dedicated local area. However, with larger and more complex architectures, often containing many different systems specifically designed to operate separately, prompt management and resolution architectures are not always available, and changes in a particular entity might cause significant operational problems affecting an entire network or collection of network resources. Even when operational problems affect only a small amount of network resources, the changes may cause deleterious effects to the associated zone integrity.

What is needed is a system and method that relates generally to Topology-Static (TS) architecture within a computer system, and more particularly to the improved management of a Topology-Static architecture.

SUMMARY OF THE INVENTION

The foregoing problems are solved in accordance with the various illustrative embodiments of the invention in which a storage area network (SAN) management system is deployed to allow a user or administrator access to various management and monitoring routines operating throughout and or local to one or more addressable locations. The SAN management system coordinates the various management entities that are deployed throughout a large interrelated enterprise. The SAN management system primarily receives information concerning the SAN, through the information passed up through the network by the individual management entities.

Initially, the information received by the SAN management system will be related to the network design, deployed hardware, configuration parameters, and the topology for the specific zones of the network. Once deployed, the individual entities will begin to interrelate, and an actual topology will be discovered and recorded. From the initial deployment information, and the actual topology discovered, the SAN management system through a delegated manager and storage, will record the initial deployment information and use that initial deployment information when receiving any future indication from another management entity that there is a change in status that will affect, for example zone integrity and or interoperability. A localized manager (and/or managers) will respond to specific changes in the status of the devices in that area of the SAN. In the various embodiments, as a manager or managers manage the original change in status, a similar change in status created by the localized management, is perceived by further management entities, typically located above the localized area of the initial change in status in the logical architecture. In the various embodiments, a localized or semi-localized management entity will be able to delegate and or direct resources to seamlessly act in accordance with, for example a response/recovery routine, and attempt a correction in status. This layered management may translate from a switch level all the way up the architecture to the management entity reporting directly to a SAN manager.

After the initial topology and deployment information is received by a SAN manager, in various embodiments, the implicit interconnections including management and other configuration parameters are known to the SAN management system. Accordingly, in various embodiments, a user and or other authorized entity are able to closely examine certain aspects of those implicit interconnections that otherwise could not be ascertained.

In various embodiments, the actual topology discovered may be used to generate specific modeling and or abstractions for determining and targeting certain management aspects and routines. Certain abstractions may generate specific lists of hardware and or software (devices and programs) that may be useful for efficiently modeling and targeted routines. In still other embodiments, and after the actual topology has been discovered, and further focused to, for example, a switch level topography, an abstraction or model of the instances of a vendor specific switch may be determined.

Other objects, features and advantages of the invention will be apparent to those skilled in the art based on the following detailed description and the accompanying drawings.

DETAILED DESCRIPTION

Figure 1:
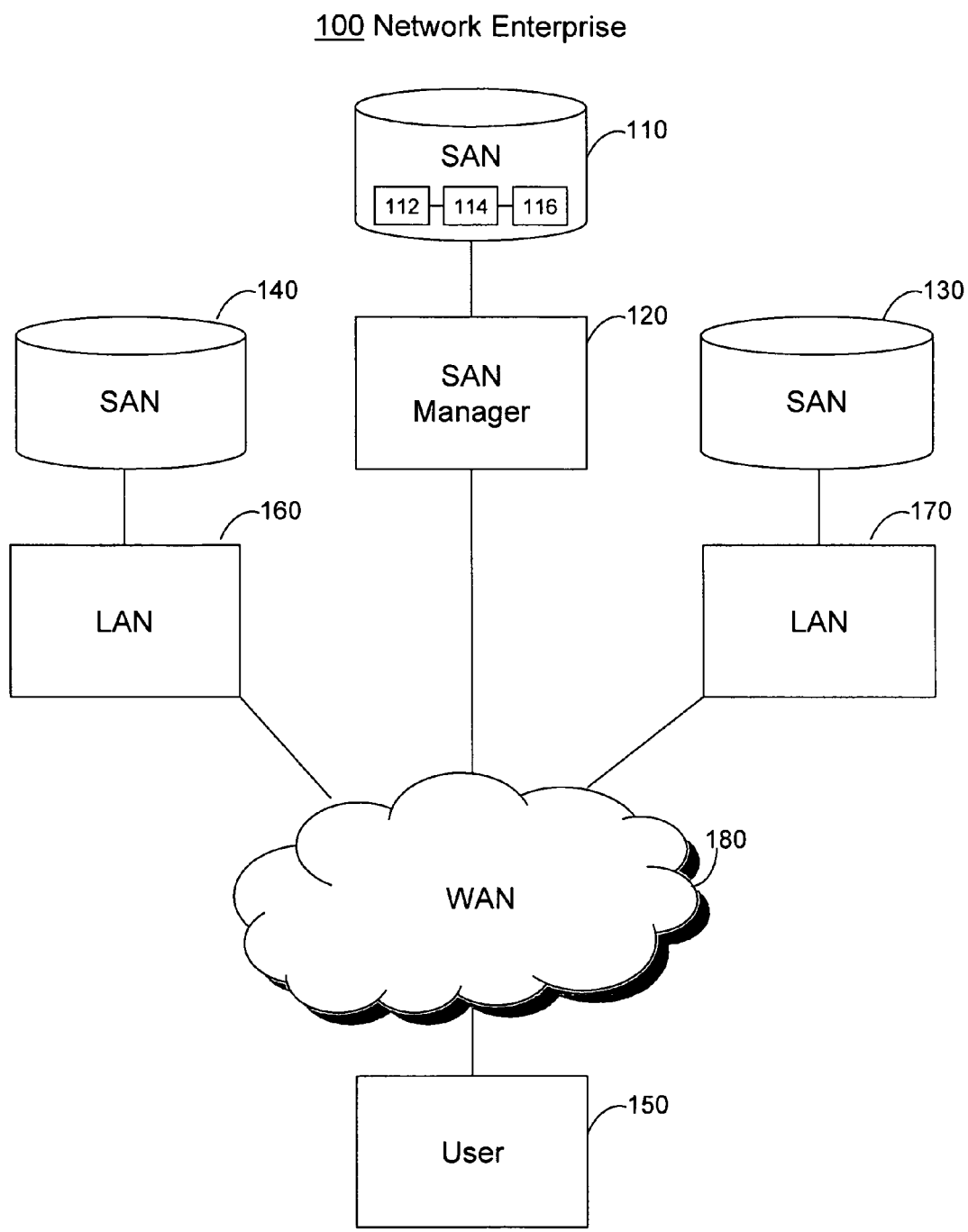
FIG. 1 is an exemplary network enterprise in which the invention may operate according to the various embodiments of the invention.

FIG. 1 is an exemplary network enterprise 100 in which the invention may operate. As shown in FIG. 1, an enterprise network 100 may have one or more storage area networks (SAN) illustrated as a SAN 110, a SAN 130 and a SAN 140. These SANs may provide storage services used by enterprise network 100. Also, as illustrated, SAN 110 includes one or more storage areas illustrated as a storage area 112, a storage area 114 and a storage area 116. SAN 130 and 140 may include other storage areas not illustrated.

Network enterprise 100 also includes a storage area network (SAN) manager 120. The SAN manager 120 provides centralized management for the storage areas directly or indirectly under its control throughout the enterprise network 100. Network enterprise 100 may also include one or more localized or local area networks (LAN) 160 and 170, a larger less localized or wide area network (WAN) 180 and a user or administrative entity 150. The above entities are operatively coupled to and may communicate between or through each other.

Figure 2:
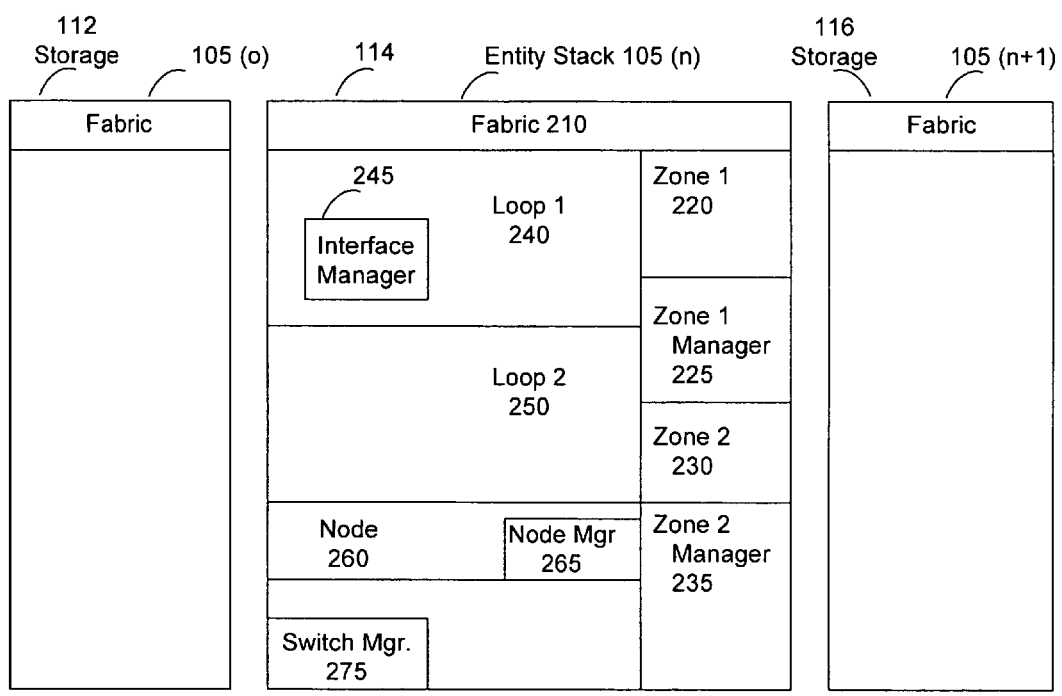
FIG. 2 is an exemplary illustration of logical architecture of a storage area network entity stack, according to the various embodiments of the invention.

FIG. 2 illustrates a logical architecture of a SAN entity stack 105(n). SAN entity stack 105(n) may, for example, be described as a coordinated architecture spanning one or more separate layered architectures. As will be appreciated, the invention may be applied to logical architectures including one or more entity stacks 105 (illustrated in FIG. 1 as a SAN entity stack 105(0), a SAN entity stack 105(n+1) in addition to SAN entity stack 105(n)).

For ease of description, entity stack 105 may also be represented as entity stack $E_n$ wherein n may represent any number or otherwise designate a specific entity stack. Entity stacks 105 represent an abstract, a high-level, logical layered, architecture for various components and/or elements of the SAN 110. As illustrated, entity stack 105 includes: a switch 270, a switch manager 275, a node 260, a node manager 265, a first loop 240, a second loop 250, an interface manager 245, a first zone 220, a first zone manager 225, a second zone 230, a second zone manager 235, and a fabric 210.

For purposes of this discussion, switch 270 corresponds to the lowest level or layer in entity stack 105; followed by a layer corresponding to node 260; followed by a layer corresponding to both second loop 250 and first loop 240; followed by a layer corresponding to both second zone 230 and first zone 220; and followed by the upper-most layer corresponding to fabric 210. Also for purposes of this discussion, switch manager 275 is associated with switch 270; node manager 265 is associated with node 260; second loop 250 and first loop 240 are associated with one or more interface managers 245; second zone manager 235 is associated with second zone 230; and first zone manager 225 is associated with first zone 220.

Each individual layer of entity stack 105 serves a specific purpose, perform specific functions, and/or provide support to SAN 110. Switch 270 and switch manager 275 represent a lowest logical layer and may correspond to the circuit and/or chip level within a particular device operational in a SAN 110. The switch manager 275, for example, may monitor and manage specific routines and parameters suited for operation of switch 270 including the specific configuration, provisioning, and discovery operations. For example, switch manager 275 may determine a position and or state (enabled high or low) of switch 270.

Entity stack 105 includes node 260 and node manager 265. In other various embodiments entity stack 105 represents the device level and may correspond to a network appliance, a router, a hub, a stand alone addressable port, or another entity that would have an IP address or employ TCP/IP protocols operational in a SAN. The node manager 265, for example, may monitor and manage specific routines and parameters suited for an individual node 260, or any operable entity with an IP address at this layer.

The second loop 250, the first loop 240, and the interface manager 245 represent the devices and or applications that are cooperatively deployed in a loop, for example an application that has shared resources located on more than one node. Accordingly, if one device and/or application were to become non-operational, the loop may not remain operational. The interface manager 245 may monitor and manage specific routines and parameters suited to an individual loop, and may take corrective measures if one or more of the devices and or applications were determined non-operational. In addition to the general parameters, the interface manager 245 may maintain a category of secure parameters indicative of a specific type of loop. These secure parameters (discussed in more detail below) relate to the state of a particular zone and may, for example, manage restrictive or otherwise secure loops in a SAN 110.

The second zone 230, the second zone manager 235, the first zone 220, and the first zone manager 225 are provisioned as a topology-static zone. This layer represents one or more zones that include all of the attendant resources found within managed storage architecture. Management for a second zone 230 and a first zone 220 may be found directly within this layer and/or indirectly within SAN manager 120. In addition, according to various embodiments of the invention a zone may also be managed and provisioned as either a topology-static strict zone or a topology-static loose zone (discussed in more detail below).

The uppermost layer includes fabric 210. The uppermost layer may be directly managed by a management entity within the uppermost layer (not shown) or indirectly managed by a management entity found within a SAN manager 120 (shown in FIG. 3). The upper-most layer represents a high-level topographical view of the individual layers of a given entity stack 105 for the SAN manager 120.

Figure 3:
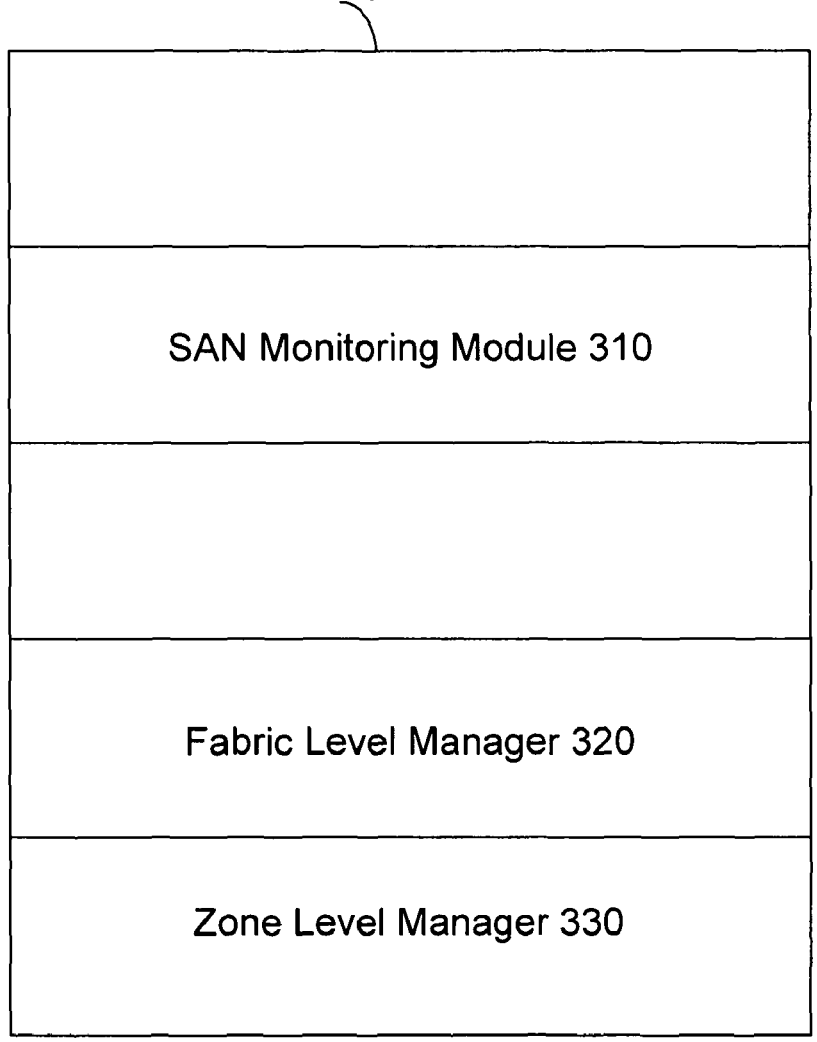
FIG. 3 is an exemplary illustration of a storage area network manager entity stack according to the various embodiments of the invention.

FIG. 3. illustrates a logical SAN manager entity stack 300. SAN manager entity stack 300 represents an abstract, high-level, logical layered, architecture for various systems, components and/or elements of the SAN manager 120. As illustrated SAN manager entity stack 300 includes: a SAN monitoring module 310, a fabric level manager 320, and a zone level manager 330. In various embodiments and as indicated above, SAN manager entity stack 300 includes a zone level manger 330 for managing second zone 230 and/or a first zone 220, and a fabric level manager 320 for managing any fabrics within SAN 110.

As illustrated in FIG. 3 and in some embodiments, SAN manager entity stack 300 includes a monitoring module 310 which has specific responsibilities including monitoring the device configuration for the entire SAN 110, and maintaining a registry of the responses that the monitoring routines may generate. In some embodiments, monitoring module 310 may be monitoring some event that triggers a change in topography. In various embodiments, SAN monitoring module 310 may monitor for specific events that may affect the topology of SAN 110 including: discovering a topology-static zone; creating a topology-static zone; deleting a topology-static zone; renaming a topology-static zone; adding a member entity to a topology-static zone; removing a member entity from a topology-static zone; adding a topology-static zone to a zone collection; and removing a topology-static zone from a zone collection.

When a change in topography is discovered, the affected topology-static zone may set a signal or flag to indicate that a zone has perceived the change in topology. In some of the various embodiments, the affected topology-static zone may set a signal I. Once a zone sets a signal "I" other devices or other zones are alerted to that change in topology, and must similarly set a signal "I" and evaluate their own localized topology and determine whether a change in topology has occurred. Specific event triggers for a zone setting a signal to "I" are discussed below. Further, while "I" is only symbolic of the underlying event, for simplicity "I" will represent intimating. For purposes of this description, an intimating signal is meant to convey an indirect message from the source to the manager that a change in topography is discovered within a topology-static zone.

One triggering event that might set an intimating signal within a topology-static zone is the addition or removal of any public device or devices found within a loop, for example first loop 240 or second loop 250. When discovering such a change in first loop 240, the first zone manager 225 will set a signal in topology-static zone 240 to "I". In various embodiments, after setting a signal "I", first zone manger 225 may await a response from SAN manager 120 before taking any action. SAN manager 120 may poll all the addressable entities within, for example, SAN 110 to receive a complete status of the entire architecture for SAN 110. SAN manager 120 may then compare the current status of the entire architecture of SAN 110 with a stored record of the most recent architecture for SAN 110 to determine whether an overall change in topology occurred. At the same time, or shortly after setting the signal "I", first zone manager 225 may send a signal "I" directly to SAN manager 120 to alert the SAN manager 120 concerning a localized change caused by the removal of a public device. One illustrative embodiment may involve the removal of a non-operational device within a first loop 240. When interface manger 245 discovers that a device located on first loop 240 is non-operational, interface manger 245 would set a signal to "I". A signal "I" set by the interface manager 245 would be discovered within a local zone, for example first zone 220 and first zone manager 225. Similarly first zone manager 225 would set a signal to "I", and that signal would be discovered by a fabric 210 and a fabric level manager 320. Similarly fabric level manager would 320 would set a signal to "I", and that signal would be discovered by SAN monitoring module 310. As these individual signals are being set, interface manager 245, first zone manager 225, and fabric level manager 320 may start to determine whether resources may be available to restore the topology to a pre-signal "I"

status. Interface manager 245, first zone manager 225, and fabric level manager 320 may in various embodiments, poll the other devices they manage to determine whether a replacement device is available, and if available whether the replacement of a non-operational device by a specific operational device would be permitted by SAN manager 120, and if permitted, what affect the replacement may have to the overall topology of SAN 110. Once responses to the poll are received by SAN manger 120 and/or the time period for response has passed, SAN manager 120 may generate a current status of the original device or location that set a signal "I", and the entire zone. In addition to a report of the current status (which SAN manager 120 may transfer to SAN monitoring module 310), SAN manager may also extract from SAN monitoring module 310 a schedule of corrective actions that may be directly communicated back to the local manager entity, first loop manager 225. Next in various embodiments the SAN manager 120 may attempt to determine whether the zone supporting the original change in status, is a topology-static zone.

In various embodiments, before any corrective action may take place within a specific zone or zones, SAN manager 120 may determine whether the corrective action is permitted. Certain requests for corrective action may immediately manifest either a permission, or a denial. Other requests may be evaluated further by, for example, first zone manager 225, and/or further management entities including SAN manager 120. Requests may be sent from interface manger 245, and these requests may include the following: discovering, creating, deleting, and renaming a topology-static zone; adding/removing a member entity to/from a zone; and adding/removing a topology-static zone from a collection of zones, or a zone set.

After first zone manager 220 receives and determines that a particular request is not manifestly unauthorized, and according to various embodiments first zone manager 220 may then redirect those requests to a switch manager, for example switch manager 275. In some embodiments of the invention, once these redirected requests are received and acknowledged by switch manager 275, SAN monitoring module 310 may be updated to reflect the request and/or event requested. SAN manager 120 may not need to coordinate the polling between first zone manager and switch manager 275 after first zone manager 220 receives a successful acknowledgement from switch manager 275, or vice versa. A successful acknowledgement establishes that first zone manager 220 and switch manger 275 are allowed to communicate; however any action by either first zone manager 220 or switch manager 275 must be coordinated by SAN manager 120.

Also, and as in various embodiments, if either first zone manager 220 or switch manager 275 detects a change in status, that change in status may be directly communicated to SAN manager 120. When acting under the direction of SAN manager 120, any topological change may be recorded and stored within SAN monitoring module 310. After updating SAN monitoring module 310, and in various embodiments first zone manager 220 may receive a signal indicating the status change from SAN monitoring module 310. Next and in various embodiments, first zone manager 220 may decide if the change occurring in a specific loop, for example first loop 240, may be caused by or triggered by an individual node from within a specific topology-static zone, for example first zone 220, setting a signal "I". At this point in the evaluation first zone manager 225 may be primarily concerned with any nodes that indicate a change in status with a set signal "I"; however all of the nodes may be polled with their responses recorded by SAN manager 120.

Figure 4:
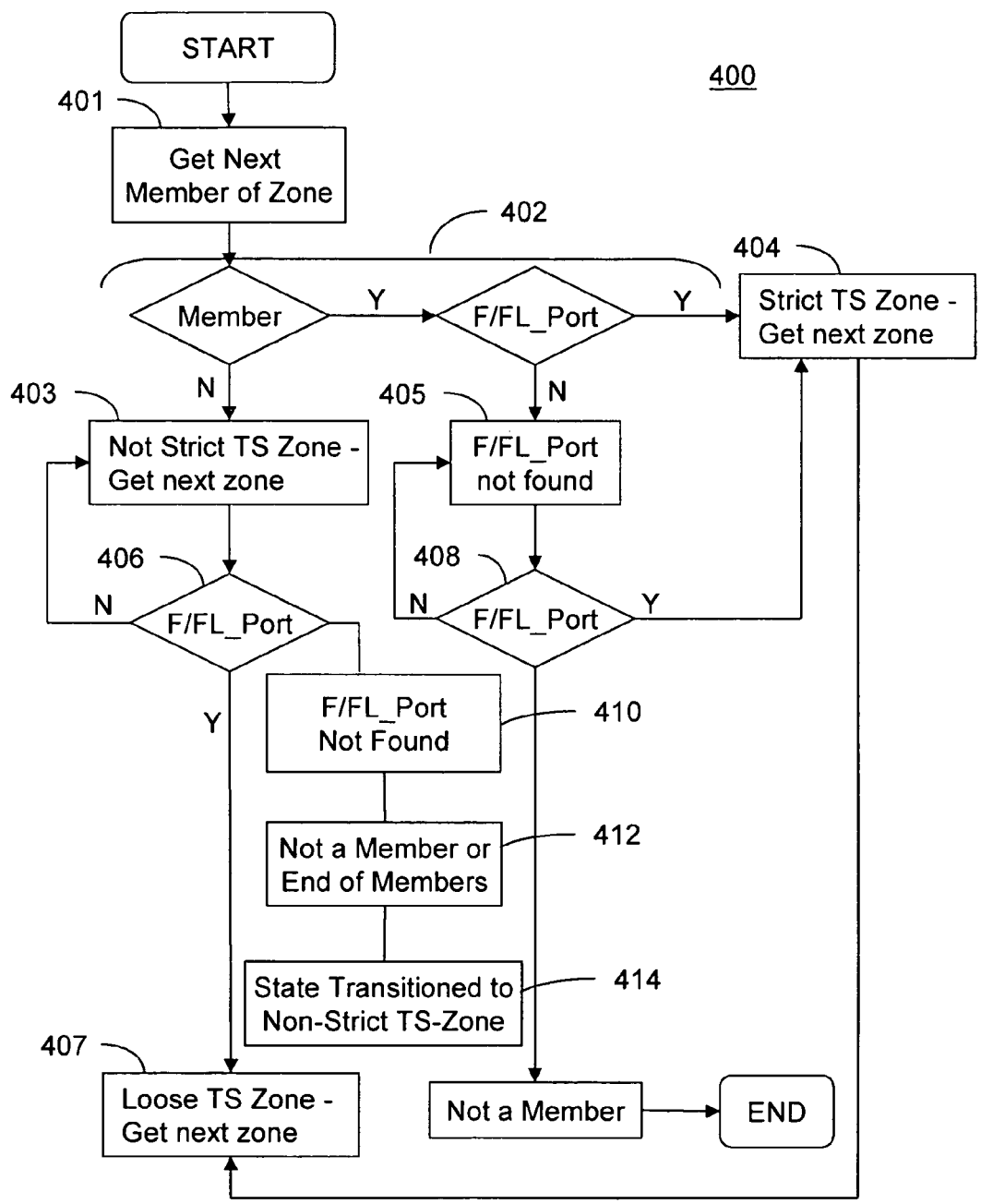
FIG. 4 is an exemplary illustration of a state diagram for a method to discover a topology-static zone according the various embodiments of the invention.
Figure 5:
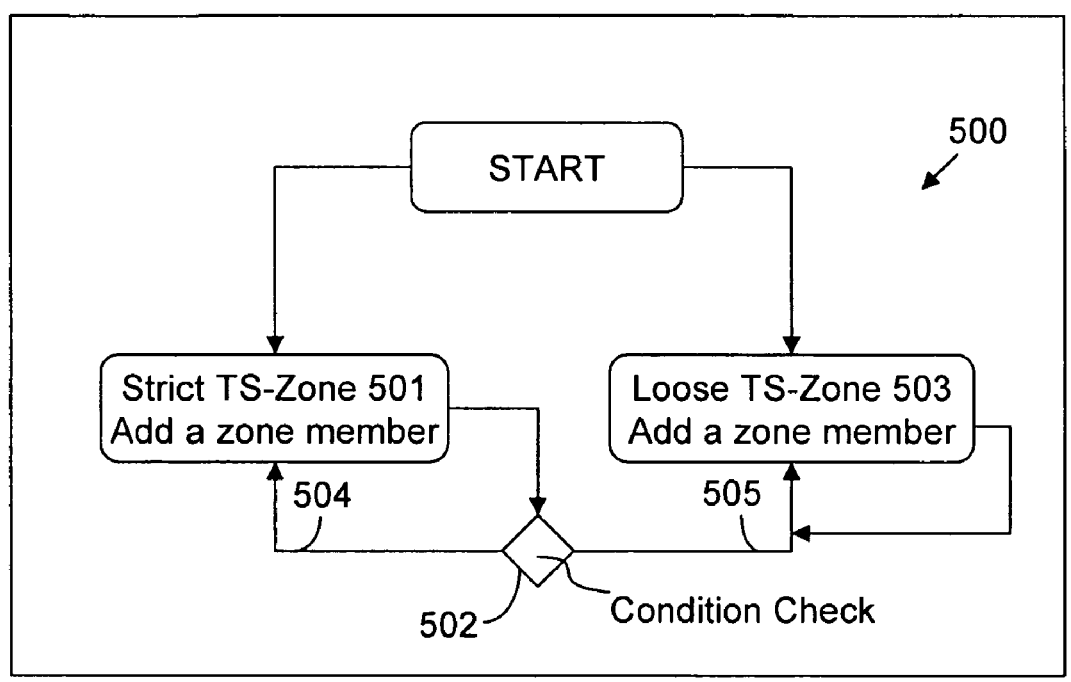
FIG. 5 is an exemplary illustration of a state diagram for a method to add a new member zone z to a topology-static zone according to the various embodiments of the invention.
Figure 6:
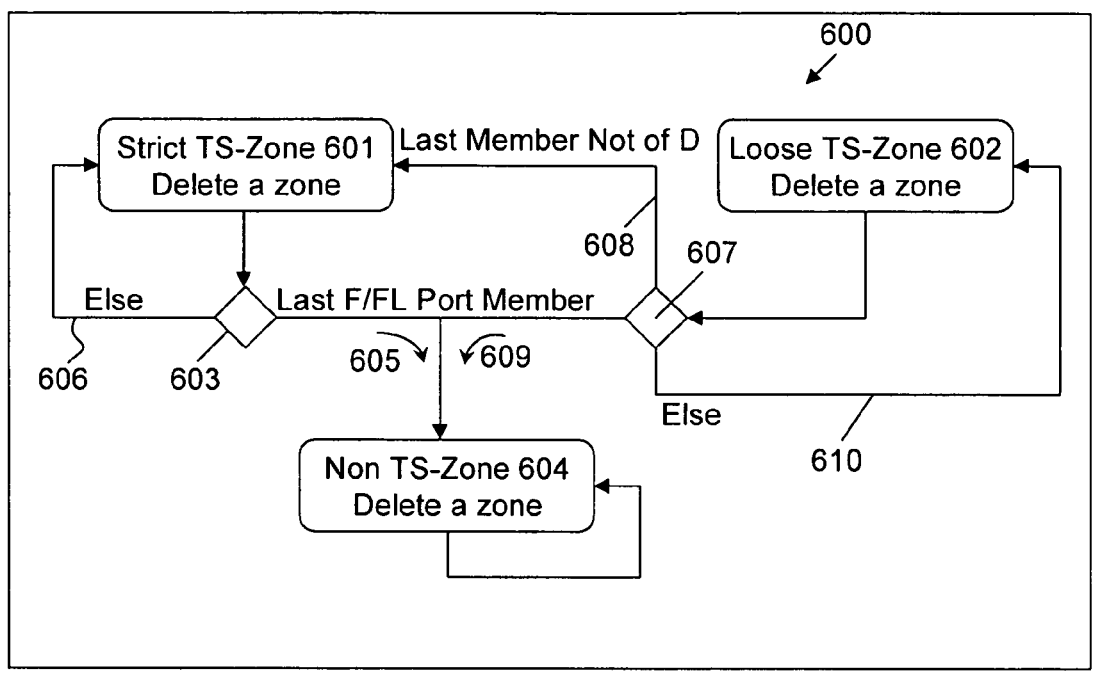
FIG. 6 is an exemplary illustration of a state diagram to delete a member entity from a topology-static zone according to the various embodiments of the invention.

FIG. 4-FIG. 6, illustrate various methods employed by SAN manager system 120. FIG. 4 illustrates a state diagram 400 for discovering a topology-static zone. Pursuant to FIG. 4 and as in various embodiments, after initialization first zone manager 225 may initiate a discovery operation 401. Discovery operation 401 may include first zone manager 225 requesting status information from switch manager 265. In addition to the status information concerning the lowest layer containing the switch manager 265, any response sent to first zone manager may also contain the entire collection of zone information within switch manager 265. In accordance with the various embodiments, an examination of the information passed may determine whether fabric-to-loop interconnection is associated with specific port identification. One example, according to illustration FIG. 4, to determine whether first zone possesses interconnection with specific port identification may be to examine any entity information contained in the information passed from switch manager 265 to first zone manager 225, for specific port identification. Only the previously polled and successfully acknowledged entities within a zone, for example first zone 220, may possess a valid port address. FIG. 4 illustrates a state diagram 400 that may be used to discover a topology-static zone in some exemplary embodiments. State diagram 400 may be stored within SAN monitoring module 310 and activated during an initial evaluation after discovering a change in status by SAN manager 120. Determining whether the zone in which a change in topology has taken place, is a topology-static zone is important since specific resources and corrective deployments may only be available to a topology-static zone. One method to determine whether the zone affected by a change in topology is a topology-static zone might be the evaluation of certain prior criteria associated with that zone (e.g., whether the zone was previously classified a topology-static zone), or other current characteristics of the particular zone. Exemplary state diagram 400 uses specific notations and symbols, including: D for domain meaning the entire collection of entities within SAN 110, F for fabric meaning fabric 210, and FL_Port for fabric-loop port meaning the addressable location for interconnection or connection between fabric 210 and a loop, for example first loop 240, to evaluate certain previous criteria and/or current characteristics of a specific zone. By following the operations through exemplary state diagram 400, discovery of a topology-static zone may be confirmed.

As illustrated in FIG. 4 and according to an exemplary embodiment, a specific instance for a method to discover a topology-static zone. The method employs a topographical-based decision engine to process an individual zone z and determine whether a zone z is a topology-static zone. During the process illustrated in FIG. 4, the state of a zone z is put through a series of evaluations. After each evaluation, the state of zone z may or may not undergo a transition. It should be understood that a state following any operation prior to the final evaluation in the process illustrated in FIG. 4 may only be temporary, and may not indicate a final state for a zone z.

At operation 401 the process requests a member of zone z for evaluation. After receiving a member of zone z, zone z is evaluated to determine whether zone z belongs to a collection of previously identified topology-static zones. If operation 401 determines that zone z belongs to a collection of previously identified topology-static zones, the process continues to operation 402. Contrarily, if operation 401 determines that zone z does not belong to a collection of previously identified topology-static zones, then process proceeds to operation 403. At operation 403 the state for zone z becomes a non-strict topology-static zone, and process proceeds to operation 406. At operation 406 zone z is evaluated to determine if zone z is defined by a F/FL_Port. If zone z is not defined by a F/FL_Port, the process loops back to operation 403 and requests the next zone z(2). If the next zone z(2) is not a member of the collection of previously identified topology-static zones, or there are no further members to request, then the state for zone z becomes a non-strict topology-static zone.

At operation 406 a third condition may exist if a F/FL_Port is not found. If operation 406 determines that a F/FL_Port is not found, the process proceeds to operation 410. At operation 410 the process may indicate F/FL_Port not found, and the process continues to operation 412. At operation 412 the process may indicate Not a Member. Additionally, when all members of a zone z have been evaluated, operation 412 may indicate End of Members. In both cases, and after operation 412 indicates Not a Member or End of Members, the process may indicate that the state has transitioned to a non-strict topology static zone.

If at operation 406 zone z is defined by a F/FL_Port, the process proceeds to operation 407. At operation 407 the state for zone z becomes a loose topology-static zone.

If zone z is a member of the collection of previously identified topology-static zones process proceeds to operation 402. If operation 402 determines that zone z is defined by a F/FL_Port or a next zone z(2) is defined by a F/FL_Port, process will proceed to operation 404. At operation 404 the state for zone z becomes a strict topology-static zone. However, if at operation 405 zone z is not defined by a F/FL_Port or at operation 408 next zone z(2) is not defined by a F/FL_Port, the state becomes F/FL_Port not found.

As FIG. 4 illustrates, if the current state is loose topology-static zone, any additional member of the collection of previously identified topology-static zones will not affect that current state. At the end of the decision engine illustrated in FIG. 4, all states except for F/FL_Port not found, will not affect that current state. When the decision engine ends on an unknown member, all states will become an error state. When the decision engine ends with either a state being strict topology-static zone or a state being a loose topology-static zone; zone z is classified accordingly.

As illustrated in FIG. 5 and according to an exemplary embodiment, is a specific instance for a method to add a new member zone z to a topology-static zone. In general, as illustrated in FIG. 5, when a new member is added to a topology-static zone, the topology-static zone may change under certain conditions. As illustrated in FIG. 5 is state diagram 500, after initialization process proceeds to operation 501, and member x is added to a zone z. After a member x is added to zone z, the process proceeds to operation 502 and member x is evaluated to determine if member x is part of the collection of predetermined members of a strict topology-zone. If member x is part of the collection of predetermined members of a strict topology-zone, adding member x to a strict topology-static zone will not change the state of zone z. However, if at operation 502 member x is evaluated and is not part of a previous collection of predetermined members of a strict-topology zone, process proceeds to operation 503. At operation 503, with the addition of a member x, the state of zone z is a loose topology-static zone. Furthermore, once zone z may be determined a loose topology-static zone, adding any new member to zone z will not trigger a change in state.

As illustrated in FIG. 6 and according to an exemplary embodiment, is a specific instance for a method to delete a member zone z from a topology-static zone. In general, as illustrated in FIG. 6, when a member is deleted from a topology-static zone, the topology-static zone may change under certain conditions. As illustrated in FIG. 6 and after initialization, at operation 601 an evaluation to delete a member entity x from a topology-static zone may be manifest in two cases: the first based on the determination at operation 601, whether the topology-static zone is a strict topology-static zone; and the second based on the determination at operation 602, whether the topology-static zone is a loose topology-static zone.

Consider, for example, that a topology-static zone is a strict topology-static zone. At operation 603 a member entity x may be deleted from a topology-static zone z, with x defined by F/FL_Port. Also, consider a member entity y, with y not within topology-static zone z or equal to x. Still further, y is defined by F/FL_Port. As shown by operation 605 and operation 604, topology-static zone z may be determined a non topology-static zone. Otherwise, and as shown in operation 606, topology-static zone z will remain a strict topology-static zone.

Consider, for example, that a topology-static zone is a loose topology-static zone. At operation 607 a member entity x may be deleted from a topology-static zone, with x not part of the group of predefined members of a topology-static zone. Another condition may exist at operation 607 indicating a member entity x is the last entity of a group. Also, consider for example, a member entity y, with y not within topology-static zone z, not equal to x, and not part of the group of predefined members of a topology-static zone. In both cases, if either x is the last entity of a group, or a member entity y, with y not within topology-static zone z, not equal to x, and not part of the group of predefined members of a topology-static zone, then, as shown in operation 608 a topology-static zone Z may be determined a Strict TS-Zone.

Also, if x may be defined by F/FL_Port, and there may exist a member entity y, with y not equal to x. Additionally, y is defined by F/FL_Port, then as may be shown by operation 609 topology-static zone Z may be determined a non topology-static zone. At operation 610, if neither determination is made (either a strict topology-static zone or non topology-static zone) the topology-static zone z may remain a loose topology-static zone.

When a topology-static zone z is sets a signal to "1"; changes in the topology will also trigger changes in the topology-static zone. FIGS. 7-10 illustrate various cases in accordance with various embodiments of the invention.

Figure 7:
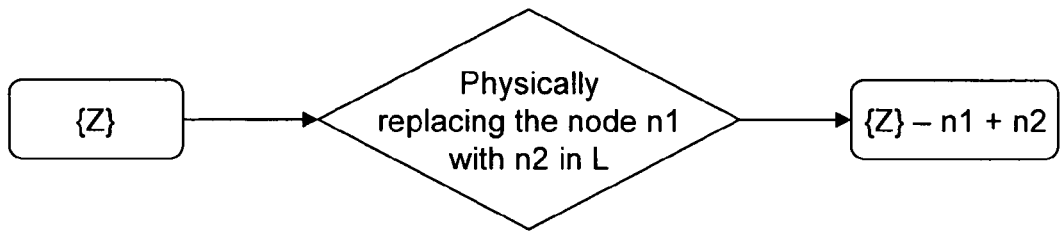
FIG. 7 is an exemplary illustration of a replacement of a node in the topology of the topology-static zone according to the various embodiments of the invention.

FIG. 7 illustrates a replacement of a node in the topology of the topology-static zone. In this example, a public node (n1) of a specific public loop is found within a topology-static zone z. Replacement of a node is defined as the deletion of public node n1 and the insertion of a public node n2. The insertion of a node n2 will happen at the port previously occupied by a node n1, and within a specific time interval (Δt).

Therefore, when a topology-static zone z sets a signal to "1", and a public node (n1) is a member of the collection of entities of topology-static zone z, the replacement of node n1 with public node n2, will be monitored by the SAN manager 120.

Figure 8:
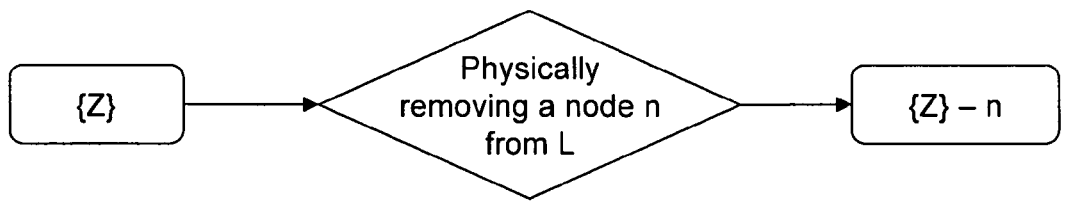
FIG. 8 is an exemplary illustration of a removal of a node in the topology of the topology-static zone according to the various embodiments of the invention.

FIG. 8 illustrates a removal of a node in the topology of the topology-static zone. In this example, a public node (n1) of a specific public loop is found within a topology-static zone z. The member node n1 is removed, unplugged, or otherwise deactivated. With the removal of a member node n1, the node will no longer be monitored by the SAN manager 120.

Figure 9:
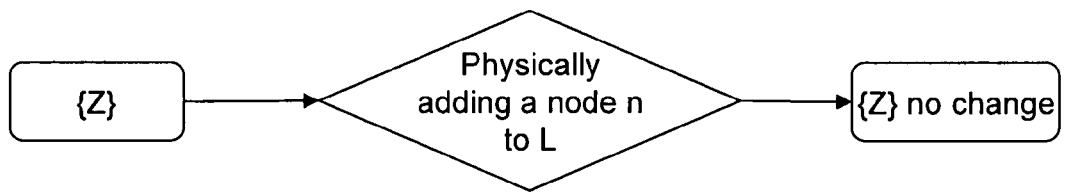
FIG. 9 is an exemplary illustration of an insertion of a node in the topology of the topology-static zone according to the various embodiments of the invention.

FIG. 9 illustrates an insertion of a node in the topology of the topology-static zone. In this example, a public node (n1) is inserted into a public loop found within a topology-static zone z. The member node n1 is connected, and considered inserted into the loop when the node is discovered. With the insertion of a node n1, the node will be discovered during the monitoring by the SAN manager 120.

Figure 10:
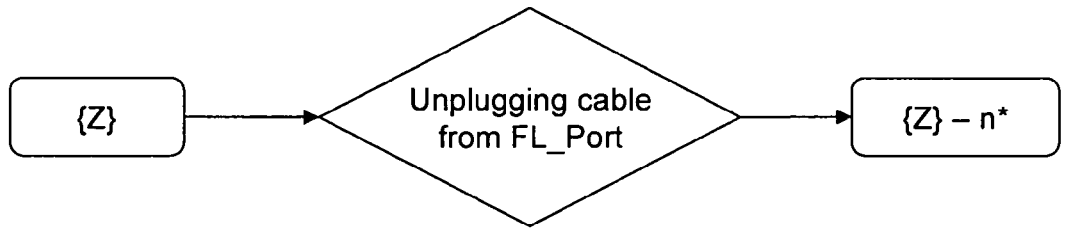
FIG. 10 is an exemplary illustration of a disconnection of a loop to a switch in the topology of the topology-static zone according to the various embodiments of the invention.

FIG. 10 illustrates a disconnection of a loop to a switch in the topology of the topology-static zone. In this example, a loop is disconnected from a switch within a topology-static zone z. The member entities of the specific loop, when disconnected from a switch, are considered removed from the topology-static zone z. The disconnection of the loop prevents further monitoring of any member entities of the loop, by the SAN manager 120.

Figure 11:
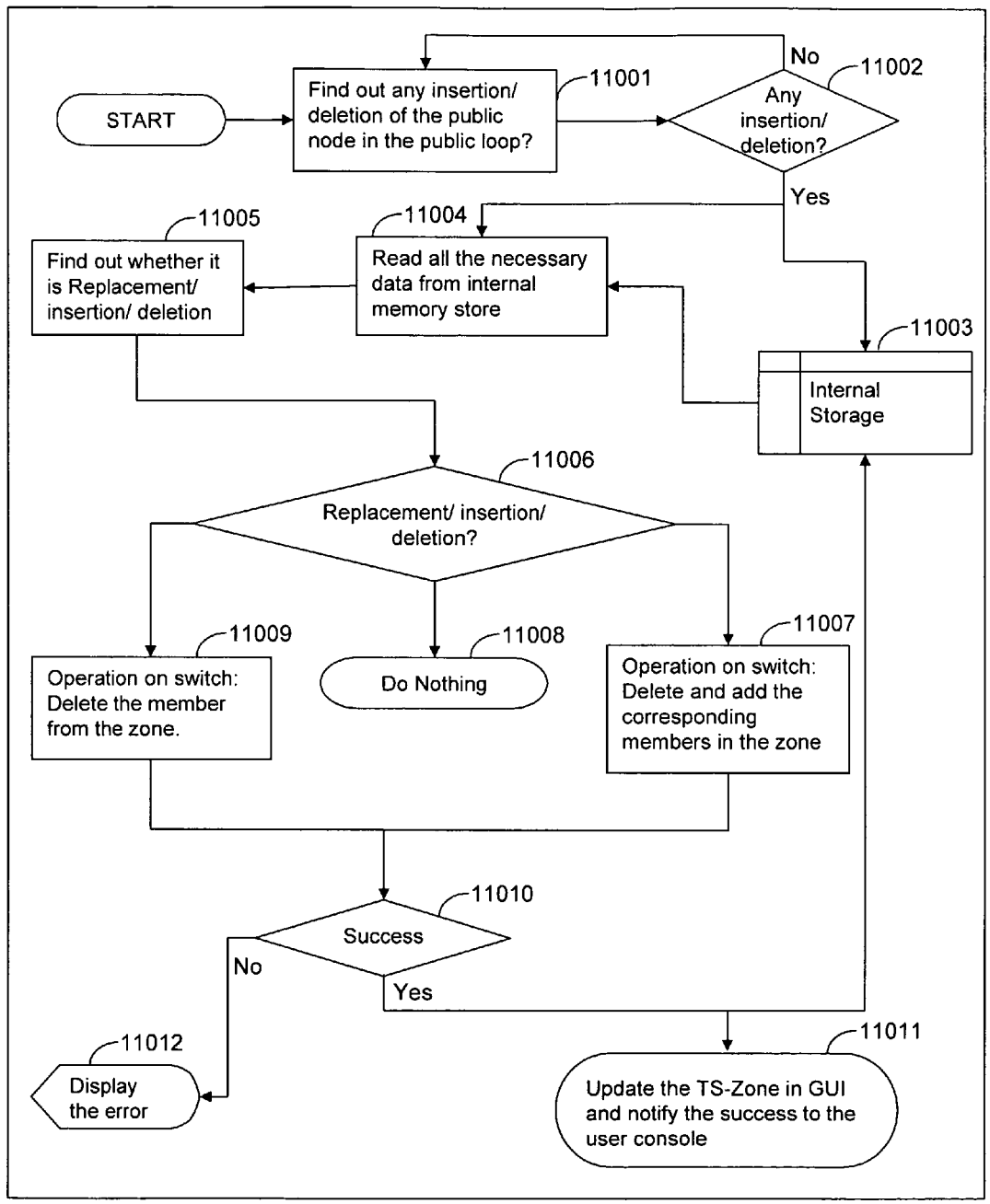
FIG. 11 is an exemplary illustration of a flow chart showing how an end user may execute exemplary topological operations according to the various embodiments of the inventive system.

FIG. 11 illustrates a flow chart 1100 showing how an end user or administrator 150 may execute exemplary topological operations pursuant to the various embodiments of the invention. To start this process the end user will initiate a call to a system supporting the SAN manager 120. The inquiry may then indirectly or directly, at operations 11001-11002, trigger a first determination whether a public node has been added to, or removed from a specific public loop within a topology-static zone z. As illustrated in FIG. 11, if the determination indicates that a public node has not been added to, or not removed from a specific public loop, the operation may return to step 11001 and await the next polling cycle or similar trigger. If the determination indicates that a public node has been added to, or removed from a specific public loop, the process will proceed on to operation 11003.

At step 11003 the process will update the information maintained within SAN monitoring module 310, and review all the necessary and related information maintained at SAN monitoring module 310. Information maintained at SAN monitoring module 310 may be deemed necessary and related to a given update, especially if the information concerns the same entity type as the entity type that affected the topology (e.g., first zone manager 225 may contain information relevant to second zone manger 235, and vice versa). In other words, if a node has been added to an existent public loop, the collection of nodes on the existent public loop has changed by the addition of a new node. From the perspective of the public loop, there has been a change in topology.

The SAN manager 120 may poll a given public loop, review all the present entities, call SAN monitoring module 310 and review the collection of entities related to the given public loop. After completing the review of the related entities, the SAN manager 120 may determine which information is necessary for updating SAN monitoring module 310, as well as if any information must be processed further, or whether any information must be gathered from an additional source, or whether any information is ready for communication to an end user, or whether the SAN manager 120 may allow the specific process to end.

In addition to information gathered from a direct change in a topology status, the SAN manager 120 may also monitor and maintain a record of indirect information about a specific change in a topology status. An example of such indirect information may be the time period between topology status events. Further, if the SAN manager 120 detects a topology change, such as the insertion of a new node, SAN manager 120 may then actively tailor future time periods to poll the status more frequently. A more frequent polling routine would be very useful when an additional entity is added, especially when the additional entity is further discovered up through the logical levels of hierarchical control and management in a particular architecture.

Conversely, a polling routine may occur less frequently when an entity is removed. Accordingly, with the removal of a given entity, the management overhead is incrementally reduced. Further, the same incremental reduction would be apparent at each level of hierarchical control and management in a particular architecture.

In operation 11006, and if one node n1 is replaced by another node n2, then the process will remove the entity node n1 from a topology-static zone z, and further add the entity node n2 to a topology-static zone z. For ease of description, we will present an example where the replacement node is placed in the position previously occupied by the original node.

In operation 11007, the process may monitor switch manager 275, and may incorporate the event-driven change into SAN monitoring module 320. In such a case and at operation 11008, the SAN manager 120 may not need any further direct determinations concerning a substitution.

In operation 11009, the process may determine that the topology status change is a deletion of a node. In accordance with the deletion of a node from topology-static zone z, the process will simply remove the node from the architecture where it had been previously. The process may monitor switch manager 275, and may incorporate the topology status change into SAN monitoring module 310. The two operations involving the replacement and the removal of a specific node are accomplished at the lowest logical level corresponding to switch 270. However, the inventive concepts of the subject invention are not limited to such a simplified substitution. Rather, as will be apparent to those skilled practitioners the concepts are easily portable and scalable for various hardware and software architectures and deployments.

If the process successfully removes or replaces a specific node, the process continues on to operations 11010 and 11011. At operation 11011, the process updates the information at various locations including, the graphical user interface (GUI) manager 245, to present a successful notification to a user 150. In addition, at step 11011, the SAN manager 120 may store the successful record in SAN monitoring module 310. However, if the process has not been successful, an error message or some similar indication will be displayed upon GUI manager 245 to present notification to the user.

While this invention has been described in conjunction with the exemplary embodiments outlined above, it is evident that many alternative, modifications and variations will be apparent to those skilled in the art. Accordingly, the exemplary embodiments of the invention, as set forth above, are intended to be illustrative, not limiting. Various changes may be made without departing from the spirit and scope of the invention, and the following claims are intended to cover such modifications and changes.

What is claimed is:

1. A storage area network (SAN) management system for managing zoning of a SAN, the SAN management system comprising:
   at least one storage device configured to store information regarding topology of a SAN including information identifying one or more zones of the SAN;
   a zone manager module configured to generate an event signal identifying a topology change in the SAN and at least one zone of the SAN associated with the topology change, wherein the topology change is associated with a status change of at least one node of the SAN;
   a monitoring module configured to:
   receive the event signal from the zone manager module,
   retrieve information from the at least one storage device related to the at least one zone identified by the event signal and related to the at least one node of the SAN associated with the topology change, wherein the retrieved information indicates a current type of the at least one zone from a plurality of zone types, wherein the plurality of zone types includes a strict topology-static zone (ts-zone) type, a non-strict ts-zone type, a loose ts-zone type and a non ts-zone type, and one or more types of ports associated with the at least one node of the SAN, and generate a correction request responsive to the event signal, wherein the correction request includes an operation that, upon execution, reconfigures the at least one zone and, based on the current type of the at least one zone and the one or more types of the ports associated with the at least one node of the SAN, results in a final zone type from the plurality of zone types being associated with the reconfigured at least one zone; and a switch manager module configured to receive and execute the correction request, and update the at least one storage device with the reconfigured at least one zone and the final zone type associated with the reconfigured at least one zone obtained as a result of the execution of the correction request.

2. The SAN management system of claim 1, further comprising an interface module coupled with a graphic user interface (GUI) configured to:

receive a request from an end user; and display a message from the switch manager module back to the end user on a display of the interface module.

3. The SAN management system of claim 1, wherein the operation to reconfigure the at least one zone includes creating a new ts-zone, deleting the at least one zone, renaming the at least one zone, adding the at least one node to the at least one zone, deleting the at least one node from the at least one zone, and replacing the at least one node of the at least one zone with another node member thereof.

4. The SAN management system of claim 1, wherein the at least one zone includes at least one loop and a port to which the loop is connected, and wherein the at least one loop includes the at least one node.

5. The SAN management system of claim 4, wherein the topology change includes a change in the loop pertaining to the at least one node of the at least one zone.

6. The SAN management system of claim 5, wherein the topology change includes at least one of: a node replacement, node insertion, and node deletion.

7. The SAN management system of claim 1, wherein the zone manager module is further configured to approve the correction request for execution by the switch manager module.

8. The SAN management system of claim 1, wherein the one or more types of ports associated with the at least one node of the SAN include a fabric port, a fabric-loop port, a fabric to fabric-loop port, and a port of a public device of a public loop attached to an active switch thereof through a fabric-loop port.

9. The SAN management system of claim 1, wherein the current type of the at least one zone and the final zone type of the reconfigured at least one zone are identical.

10. The SAN management system of claim 1, wherein the current type of the at least one zone and the final zone type of the reconfigured at least one zone are different.

11. A method for managing topological and zoning operations of a SAN, the method executed by one or more processors configured to perform a plurality of operations, the operations comprising:

determining a topology change of a node in a loop and a topology-static zone (ts-zone) of a SAN associated with the topology change, wherein the topology change includes at least one of: an insertion of a public node, a deletion of a public node, or replacement of a public node in the loop;

retrieving data from at least one internal storage device regarding the ts-zone associated with the topology change and regarding the node in the loop associated with the topology change, wherein the retrieved data from the at least one internal storage device:

indicates a current type of the ts-zone from a plurality of zone types, wherein the plurality of zone types includes a strict ts-zone type, a non-strict ts-zone type, a loose ts-zone type and a non ts-zone type, and one or more types of ports associated with the node in the loop, specifies an operation for deleting a node from the ts-zone when the topology change is deletion of the node from the loop, and specifies an operation for deleting the node to be replaced and an operation for adding a new node to replace the deleted node when the topology change is replacement of the node in the loop, wherein the execution of at least one of the operation for deleting the node or the operation for adding the new node results in a final zone type from the plurality of zone types being associated with the ts-zone, based on the current type of the ts-zone and the one or more types of the ports associated with the node in the loop; and updating data stored in the at least one internal storage device when the deletion operation or replacement operation is successful to reflect the node change in the loop of the ts-zone and the final zone type of the ts-zone.

12. The method of claim 11, further comprising updating a ts-zone on a GUI and communicating that a deletion operation or a replacement operation is successful to reflect the node change in the loop of the ts-zone to a user console.

13. A method for managing topological and zoning operations of a SAN, the method executed by one or more processors configured to perform a plurality of operations, the operations comprising:

storing, in at least one storage device, information regarding topology of a SAN including information identifying one or more zones of the SAN;

generating an event signal identifying a change in the topology of the SAN and at least one zone of the SAN associated with the topology change, wherein the topology change is associated with a status change of at least one node of the SAN;

retrieving information from the at least one storage device related to the at least one zone identified by the event signal and related to the at least one node of the SAN associated with the topology change, wherein the retrieved information indicates a current type of the at least one zone from a plurality of zone types, wherein the plurality of zone types includes a strict topology-static zone (ts-zone) type, a non-strict ts-zone type, a loose ts-zone type and a non ts-zone type, and one or more types of ports associated with the at least one node of the SAN;

generating a correction request responsive to the event signal, wherein the correction request includes an operation that, upon execution, reconfigures the at least one zone and, based on the current type of the at least one zone and the one or more types of the ports associated with the at least one node of the SAN, results in a final zone type from the plurality of zone types being associated with the reconfigured at least one zone; and executing the correction request and updating the at least one storage device with the reconfigured at least one zone and the final zone type associated with the reconfigured at least one zone obtained as a result of the execution of the correction request.

14. The method of claim 13,
wherein the operation to reconfigure the at least one zone includes creating a new ts-zone, deleting the at least one zone, renaming the at least one zone, adding the at least one node to the at least one zone, deleting the at least one node from the at least one zone, and replacing the at least one node of the at least one zone with another node member thereof.

15. The method of claim 14, wherein said deleting the at least one node from the at least one zone, wherein the at least one zone is determined as a ts-zone, comprises:
indicating the ts-zone is a non ts-zone when a deleted first node is defined by a fabric to fabric-loop port and there does not exist a second node in the ts-zone equal to the first node, and the second node is defined by the fabric to fabric-loop port when the ts-zone is a strict ts-zone; and
maintaining the ts-zone as a strict ts-zone when the deleted first node is defined by the fabric to fabric-loop port and there does exist the second node in the ts-zone equal to the first node, and the second node is defined by the fabric to fabric-loop port when the ts-zone is the strict ts-zone.

16. The method of claim 14, wherein said deleting the at least one node from the at least one zone, wherein the at least one zone is determined as a ts-zone, comprises:
indicating a loose ts-zone is a strict ts-zone when a deleted first node is not defined by at least one of: a fabric port, a fabric-loop port, and a port of a public device of a public loop attached to its only active switch through the fabric-loop port, and there does not exist a second node in the ts-zone equal to the first node, and the second node is not defined by at least one of: the fabric port, the fabric-loop port, and the port of a public device of a public loop attached to its only active switch through the fabric-loop port when the ts-zone is the loose ts-zone;
indicating the loose ts-zone is a non ts-zone when the deleted first node is defined by the fabric to fabric-loop port and there does not exist the second node in the ts-zone equal to the first node, and the second node is defined by the fabric to fabric-loop port;
maintaining the loose ts-zone when having the deleted first node defined by at least one of: the fabric port, the fabric-loop port, and the port of a public device of a public loop attached to its only active switch through the fabric loop port, and there does exist the second node in the ts-zone equal to the first node, and the second node is defined by at least one of: the fabric port, the fabric-loop port, and the port of a public device of a public loop attached to its only active switch through the fabric-loop port when the ts-zone is the loose ts-zone; and maintaining the loose ts-zone when having the deleted first node not defined by the fabric to fabric-loop port and there does exist the second node in the ts-zone equal to the first node, and the second node is not defined by the fabric to fabric-loop port when the ts-zone is the loose ts-zone.

17. The method of claim 14, further comprising confirming the current type of the at least one zone, wherein said confirming comprises:
retrieving a list including entities of the SAN within the at least one zone;
determining the at least one zone as a non strict ts-zone if a first member entity of the at least one zone including the entities of the SAN within the at least one zone is not defined by at least one of: a fabric port, a fabric-loop port, and a port of a public device of a public loop attached to its only active switch through the fabric-loop port; retrieving a second member entity of the at least one zone including the entities of the SAN within the at least one zone from the list; and
determining the at least one zone as a loose ts-zone if the second member entity of the at least one zone including the entities of the SAN within the at least one zone is defined by the fabric to fabric-loop port, wherein when the at least one zone is a loose ts-zone, and a status of the at least one zone remains the same for any additional member entity.

18. The method of claim 17, wherein said confirming the current type of the at least one zone further comprises:
determining the at least one zone as a strict ts-zone if an additional zone entity is defined by a fabric to fabric-loop port;
retrieving a second additional entity from an entity list including all member entities of the at least one zone; and
determining the at least one zone as a loose ts-zone if the second additional entity does not belong to at least one of: a fabric port, a fabric-loop port, and a port of a public device of a public loop attached to its only active switch through the fabric-loop port.

19. The method of claim 17, wherein said confirming the current type of the at least one zone further comprises:
determining the at least one zone as a fabric to fabric-loop port not found if an additional zone entity is not defined either from at least one of: a fabric port, a fabric-loop port, and a port of a public device of a public loop attached to its only active switch through the fabric-loop port, or by the fabric to fabric-loop port;
retrieving a second additional entity from the at least one zone including the entities of the SAN of the at least one zone;
determining the at least one zone as a non strict ts-zone if the second additional entity does not belong to at least one of: the fabric port, the fabric-loop port, and the port of a public device of the public loop attached to its only active switch through the fabric-loop port, or is a last zone from the entities of the SAN of the at least one zone; and
determining the at least one zone as a strict ts-zone if the second additional entity is defined by a fabric-fabric loop.

20. The method of claim 14, wherein said adding the at least one node to the at least one zone, wherein the at least one zone is determined as a ts-zone, comprises:
adding a first member to the ts-zone such that the first member belongs to at least one of: a fabric port, a fabric-loop port, and a port of a public device of a public loop attached to its only active switch through the fabric-loop port, wherein the status of the ts-zone will be maintained; and
adding the first member to the ts-zone such that the first member does not belong to the at least one of: the fabric port, the fabric-loop port, and the port of a public device of a public loop attached to its only active switch through the fabric-loop port, wherein the state of the ts-zone will be changed to a loose ts-zone.

21. The method of claim 20, wherein a ts-zone remains strict ts-zone.

22. The method of claim 14, wherein the at least one zone includes at least one loop and a port to which the loop is connected, and wherein the at least one loop includes the at least one node.

23. The method of claim 22, wherein the topology change includes a change in the loop pertaining to the at least one node of the at least one zone including at least one of: a node replacement, node insertion, and node deletion.

* * * * *